(12) United States Patent
Shui

(10) Patent No.: US 11,754,014 B2
(45) Date of Patent: Sep. 12, 2023

(54) APPARATUS AND METHOD FOR CONTROLLING TRANSITIONS IN A MULTI-COMBUSTION MODE INTERNAL-COMBUSTION ENGINE WITHIN A HYBRID-ELECTRIC VEHICLE

(71) Applicant: Fang Shui, South Lyon, MI (US)

(72) Inventor: Fang Shui, South Lyon, MI (US)

(*) Notice: Subject to any disclaimer, the term of this patent is extended or adjusted under 35 U.S.C. 154(b) by 0 days.

(21) Appl. No.: 17/661,851

(22) Filed: May 3, 2022

(65) Prior Publication Data

US 2022/0381197 A1 Dec. 1, 2022

Related U.S. Application Data

(63) Continuation-in-part of application No. 17/329,330, filed on May 25, 2021, now abandoned.

(51) Int. Cl.
*F02D 41/30* (2006.01)
*B60W 20/15* (2016.01)
(Continued)

(52) U.S. Cl.
CPC ......... *F02D 41/3041* (2013.01); *B60W 10/06* (2013.01); *B60W 20/15* (2016.01);
(Continued)

(58) Field of Classification Search
CPC ............. F02D 41/3041; F02D 41/3064; F02D 41/3035; F02D 2250/21; B60W 10/06;
(Continued)

(56) References Cited

U.S. PATENT DOCUMENTS

| 6,209,672 B1 * | 4/2001 | Severinsky | B60K 6/442 180/65.23 |
|---|---|---|---|
| 6,875,154 B2 | 4/2005 | Kaisha | |

(Continued)

FOREIGN PATENT DOCUMENTS

| CN | 102371999 B | 9/2015 |
|---|---|---|
| CN | 103847492 B | 7/2017 |

(Continued)

*Primary Examiner* — George C Jin
(74) *Attorney, Agent, or Firm* — Diana D. Brehob; Brehob Law, PLLC

(57) ABSTRACT

Vehicle designers are largely walking away from internal-combustion engines to battery and electric motors. Until infrastructure is developed to support total electrification, hybrid-electric vehicles (HEVs) which include both an internal combustion engine and an electric machine are a step toward electrification and higher system fuel efficiency while retaining the expected vehicle range. To obtain even higher system fuel efficiency combustion modes that provide higher efficiency than spark-ignition (SI) operation can be used in HEVs. A problem with such combustion modes is that they cannot be used over as wide an operating range as SI operation and transitions among modes is slow and cumbersome. By having the ICE installed into a HEV be a multi-combustion mode engine and having the EM to coordinate mode switches to be smooth, the high fuel-efficiency of alternative combustion modes can be exploited while providing smooth operation expected by vehicle users.

20 Claims, 11 Drawing Sheets

(51) Int. Cl.
*B60W 10/06* (2006.01)
*B60W 10/08* (2006.01)

(52) U.S. Cl.
CPC ..... *B60W 10/08* (2013.01); *B60W 2510/0638* (2013.01); *B60W 2510/0657* (2013.01); *B60W 2710/0622* (2013.01); *B60W 2710/244* (2013.01); *F02D 2250/21* (2013.01)

(58) Field of Classification Search
CPC .............. B60W 10/15; B60W 10/08; B60W 2510/0638; B60W 2510/0657; B60W 2710/0622; B60W 2710/244; B60W 2710/081; B60W 2710/083; B60K 1/00; B60K 17/356; B60Y 2200/92
See application file for complete search history.

(56) References Cited

U.S. PATENT DOCUMENTS

| | | | |
|---|---|---|---|
| 7,469,672 B2 | 12/2008 | Andri | |
| 7,487,852 B2 | 2/2009 | Leone et al. | |
| 7,694,760 B2* | 4/2010 | Leone | B60W 10/06 180/65.23 |
| 7,748,481 B2 | 7/2010 | Holmes et al. | |
| 8,147,377 B2* | 4/2012 | Stoffels | B60W 10/023 477/107 |
| 8,276,555 B2 | 10/2012 | Kang et al. | |
| 8,322,324 B2 | 12/2012 | Ramappan et al. | |
| 8,630,760 B2* | 1/2014 | Kang | B60W 20/00 701/22 |
| 2002/0121263 A1* | 9/2002 | Chmela | F02B 1/12 123/304 |
| 2006/0042587 A1* | 3/2006 | Ellinger | B60W 20/00 477/3 |
| 2007/0181354 A1* | 8/2007 | Andri | B60W 20/00 903/903 |
| 2007/0205028 A1* | 9/2007 | Leone | B60W 20/00 180/65.28 |
| 2007/0205029 A1* | 9/2007 | Leone | B60W 20/15 903/906 |
| 2008/0022686 A1* | 1/2008 | Amdall | B60W 10/26 180/65.265 |
| 2008/0276913 A1* | 11/2008 | Zubeck | B60W 10/08 123/549 |
| 2009/0211825 A1* | 8/2009 | Mann | B60W 10/06 180/65.21 |
| 2010/0030447 A1 | 2/2010 | Smyth et al. | |
| 2010/0077845 A1 | 4/2010 | Pattantyus et al. | |
| 2014/0352655 A1 | 12/2014 | Rajagopalan et al. | |
| 2015/0353074 A1 | 12/2015 | Kinoshita et al. | |
| 2015/0377164 A1* | 12/2015 | Kanno | B60K 6/445 123/406.12 |
| 2017/0320482 A1* | 11/2017 | Leone | F02M 26/36 |
| 2018/0022339 A1* | 1/2018 | Leone | F02M 25/022 701/22 |
| 2019/0375284 A1* | 12/2019 | Tomoda | F02B 75/28 |
| 2020/0108817 A1* | 4/2020 | Kim | F02D 41/3064 |

FOREIGN PATENT DOCUMENTS

| | | |
|---|---|---|
| JP | 2005163718 A | 6/2005 |
| JP | 3888250 B2 | 2/2007 |
| JP | 2008281002 A | 11/2008 |
| JP | 2011179386 A | 9/2011 |
| JP | 2011240840 B2 | 12/2011 |
| JP | 5105064 B3 | 12/2012 |
| JP | 5514623 B2 | 6/2014 |
| JP | 5520641 B2 | 6/2014 |
| JP | 5525317 B2 | 6/2014 |
| JP | 2015140728 A | 8/2015 |

* cited by examiner

APPARATUS AND METHOD FOR CONTROLLING TRANSITIONS IN A MULTI-COMBUSTION MODE INTERNAL-COMBUSTION ENGINE WITHIN A HYBRID-ELECTRIC VEHICLE

FIELD

The present disclosure relates to combustion-mode switching in a hybrid electric vehicle.

BACKGROUND

Internal combustion engines remain an important power source in automotive transportation. Unfortunately, combustion of fossil fuels is a significant contributor to greenhouse gas, which is largely responsible for climate change. Electrification of vehicles is coming on at a rapid rate. To help bridge the gap when electric vehicles are universally available, highly efficient automobiles are desired. Alternatively, if synthetic fuels, such as methanol or green hydrogen through electrolysis powered by solar or wind power, continue to develop and become sustainable and economically competitive, internal combustion engines may continue long into the future alongside electric vehicles.

Most modern internal combustion engines are spark-ignition (SI) operating on gasoline or compression-ignition (CI) operating on diesel fuel. Although CI engines provide higher efficiency than SI engines, they present emission problems that are not as readily soluble. In particular, they produce nitrogen oxides that lead to smog and aftertreatment solutions using urea and a trap are cumbersome. Also, CI engine produce particulate matter, which must be collected in a particulate filter and regenerated; again, this is a cumbersome solution.

There are alternative combustion modes that have been worked on for years: homogenous-charge, compression-ignition (HCCI) engines, controlled autoignition (CAI) engines, optimized kinetic process (OKP) engines, and spark assisted compression ignition (SACI) engines. Although they have indicated great promise to reduce CO2 (increased fuel efficiency), none of them are suitable over the entire operating range to provide a fully-functioning vehicle with drivability comparable to state-of-the-art vehicles. That is, an internal combustion engine operating in one of these alternative combustion modes can only produce roughly half the power as when the engine is operating in conventional combustion modes (CI or SI). Thus, it has long been proposed that the automobile operate in one of these alternative combustion modes when possible and switch to SI or CI operation only in operating ranges in which the alternative combustion mode is not attainable to obtain high power. In this manner, overall vehicle efficiency is improved.

It is also well-known in the art that it is difficult to make combustion mode-switching in a conventional vehicle without operational difficulties such as torque fluctuations including even complete lack of combustion and unacceptably slow transitions when a change in operating point is requested by the operator of the vehicle, whether that be a human or autonomous. Not only is the transition slow, it is likely to lead to unstable combustion during the transition. This is unacceptable to a driver of a modern vehicle. Furthermore, unstable combustion can lead to unacceptably high emissions. Systems and methods to realize the advantages of high-efficiency combustion modes without the concomitant operational disadvantages of such switching among combustion modes are desired.

SUMMARY

To overcome drawbacks in the prior art, the internal combustion engine (ICE) of the hybrid electric vehicle (HEV) is commanded to a transition operating point between a current combustion mode and a new combustion mode with a transition between the two combustion modes. The transition operating point is one that is known to be a stable point and also allows the ICE to make the necessary adjustments to enter the new combustion mode. The necessary adjustments can include one or more of intake pressure, intake temperature, compression ratio, valve timing, an amount of exhaust gas recirculation, etc. In a conventional engine, i.e., without an electric machine, it is not possible to access a transition operating point because the amount of torque at the transition operating point must match what the operator of the vehicle is demanding. It would be wholly unacceptable for the torque to drop or soar during such transition. However, in an HEV, the electric machine and the battery to which the electric machine is coupled can be used to absorb extra torque or supply torque so that the operator demand can be met.

A method is disclosed to exploit the advantages of an HEV to transition between combustion modes. The HEV has an electric machine (EM) mechanically linked to an internal-combustion engine (ICE) and a battery electrically coupled to the EM. The method includes: determining that a transition from a current combustion mode to a new combustion mode should be commanded with a transition interval occurring between the current combustion mode and the new combustion mode; selecting one of a plurality of predetermined combustion mode-switching operating points for operating the ICE during the transition interval; and commanding the ICE to attain the selected predetermined combustion mode-switching operating point during the transition interval. When the selected predetermined combustion mode-switching operating point of the ICE produces insufficient torque to prevent ICE speed from decreasing, the EM acts as a motor and drives the ICE to thereby maintain the selected predetermined combustion mode-switching operating point of the ICE. When the selected predetermined combustion mode-switching operating point of the ICE produces torque that would cause ICE speed to increase, the EM acts as a generator and loads the ICE to thereby maintain the selected predetermined combustion mode-switching operating point of the ICE.

The ICE undergoes preparation to operate in the new combustion mode during the transition interval. The preparation involves at least one of: heating or cooling an intake air system of the ICE (depending on the nature of the combustion mode moving to), raising or lowering pressure in the intake air system of the ICE, increasing or decreasing exhaust gas fraction in intake air being inducted into the ICE, changing the compression ratio of the ICE, changing the air-fuel ratio into the ICE, changing the fuel injection timing and quantity for the ICE, changing the ignition timing of the ICE, and altering the valve timing of valves of the ICE. Additionally, the fuel supply may be discontinued or restarted, depending on the combustion mode. The method also includes commanding the ICE to operate in the new combustion mode when the preparation has been completed.

The selected predetermined combustion mode-switching operating point is based on state of charge of the battery. In some embodiments, the selected predetermined combustion mode-switching operating point is further based on a demand for torque from the HEV by an operator of the vehicle and an expected duration of the transition interval. The operator of the vehicle can be a person driving the HEV typically communicating via an accelerator pedal. Alternatively, the operator can be an autonomous controller in a self-driving controller.

Determination that a transition from the current combustion mode to the new combustion mode should be commanded is based on efficiency of the HEV operating in the new combustion mode being greater than efficiency of the HEV operating in the current combustion mode.

Determination that the transition from the current combustion mode to the new combustion mode is based on state of charge of the battery and the ICE being at a suitable temperature to support stable combustion in the new combustion mode. In some embodiments, this could be a cold start situation in which the ICE should be sufficiently warmed up to transition to the new combustion mode. In other types of transitions, temperature in the ICE, particularly in the intake, should be lower than a predetermined level so that stable combustion occurs in the new combustion mode.

Some HEVs are a series configuration in which the EM electrically couples to the battery and both the EM and the ICE are mechanically linked. The HEV also has a second EM electrically coupled to the battery. The driving wheels are HEV mechanically connected to the second EM.

In other embodiments, the HEV is a parallel configuration in which the EM electrically coupled to the battery and both EM and ICE are mechanically linked. The both EM and ICE are mechanically connected to driving wheels of the HEV during the transition.

Also disclosed is a hybrid electric vehicle (HEV) that includes: an electric machine (EM), an internal-combustion engine (ICE) mechanically linked to the EM, a battery electrically coupled to the EM, and a coordination controller (CC) coupled to the EM, the ICE, and the battery electronically. The CC: determines that a transition from a current combustion mode to a new combustion mode should be commanded with a transition interval occurring between the current combustion mode and the new combustion mode, selects one of a plurality of predetermined combustion mode-switching operating points for operating the ICE during the transition interval, and commands the ICE to attain the selected predetermined combustion mode-switching operating point during the transition interval. When the selected predetermined combustion mode-switching operating point of the ICE produces insufficient torque to prevent ICE speed from decreasing during the transition, the EM acts as a motor and drives the ICE to thereby maintain the selected predetermined combustion mode-switching operating point of the ICE. When the selected predetermined combustion mode-switching operating point of the ICE produces torque that would cause ICE speed to increase during the transition, the EM acts as a generator and loads the ICE to thereby maintain the selected predetermined combustion mode-switching operating point of the ICE.

The selected predetermined combustion mode-switching operating point is based on at least one of: state of charge of the battery and operator demanded torque at the driving wheels.

The ICE undergoes preparation to operate in the new combustion mode during the transition interval. The preparation involves at least one of: adjusting temperature in the intake air system of the ICE, adjusting pressure in the intake air system of the ICE, changing exhaust gas fraction in intake air being inducted into the ICE, changing the compression ratio of the ICE, changing the air-fuel ratio into the ICE, changing the fuel injection timing and quantity for the ICE, changing the ignition timing of the ICE, and altering the valve timing of valves of the ICE. The CC commands the ICE to operate in the new combustion mode when the preparation has been completed.

Determination whether to command a transition from the current combustion mode to the new combustion mode is based on efficiency of the HEV operating in the new combustion mode being greater than efficiency of the HEV operating in the current combustion mode.

Determination whether to command a transition from a current combustion mode to a new combustion mode is further based on at least one of: operator demanded torque, the ICE being sufficiently warm, in some embodiments, or sufficiently cool, in other embodiments, to support stable combustion in the new combustion mode, and state of charge of the battery.

In some embodiments, the HEV is a series configuration in which the EM is a first EM and including a second EM electrically coupled to the battery. Driving wheels of the HEV are mechanically connected to the second EM.

In other embodiments, the HEV is a parallel configuration in which the EM and the ICE are mechanically linked. Both the EM and the ICE are connected to driving wheels of the HEV mechanically.

Also disclosed is a method to control a series hybrid electric vehicle (HEV) having a first electric machine (EM1) mechanically linked to an internal-combustion engine (ICE), a second electric machine (EM2) mechanically connected to driving wheels of the HEV, and a battery electrically coupled to EM1 and EM2. The method includes: determining that a transition from a current combustion mode to a new combustion mode should be commanded with a transition interval occurring between the current combustion mode and the new combustion mode; selecting one of a plurality of predetermined combustion mode-switching operating points for operating the ICE during the transition interval; commanding the ICE to attain the selected predetermined combustion mode-switching operating point during the transition interval; and commanding the ICE to the new combustion mode after the transition interval.

During the transition interval, the ICE is prepared to operate in the new combustion mode, such preparation includes at least one of: adjusting temperatures in the intake of the ICE; adjusting an intake pressure of the ICE adjusting the fraction of exhaust gases recycled into the intake of the ICE; changing compression ratio of the ICE; changing the air-fuel ratio into the ICE, changing the fuel supply strategy including fuel injection timing and quantity of the ICE, and altering the valve timing and lifting of valves of the ICE.

When the selected predetermined combustion mode-switching operating point of the ICE produces insufficient torque to prevent ICE speed from decreasing, EM1 acts as a motor and drives the ICE to thereby maintain the selected predetermined combustion mode-switching operating point of the ICE. The battery supplies electric power to EM1 for driving the ICE and the battery supplies electric power to EM2 for driving wheels of the HEV during combustion mode transition.

When the selected predetermined combustion mode-switching operating point of the ICE produces torque that would cause ICE speed to increase, EM1 acts as a generator and loads the ICE to thereby maintain the selected predetermined combustion mode-switching operating point of the ICE. The battery absorbs the electric power from EM1 for loading the ICE. The battery and EM1 supply electric power to EM2 accordingly for driving wheels of the HEV during combustion mode transition.

Also disclosed is a method to control a parallel hybrid electric vehicle (HEV) having a first electric machine (EM1) mechanically linked to an internal-combustion engine (ICE), and both the EM1 and the ICE are mechanically connected to driving wheels of the HEV, and a battery electrically coupled to EM1. The method includes: determining that a transition from a current combustion mode to a new combustion mode should be commanded with a transition interval occurring between the current combustion mode and the new combustion mode; selecting one of a plurality of predetermined combustion mode-switching operating points for operating the ICE during the transition interval; commanding the ICE to attain the selected predetermined combustion mode-switching operating point during the transition interval; and commanding the ICE to the new combustion mode after the transition interval.

During the transition interval, the ICE is prepared to operate in the new combustion mode, such preparation includes at least one of: adjusting temperatures in the intake of the ICE; adjusting an intake pressure of the ICE adjusting the fraction of exhaust gases recycled into the intake of the ICE; changing compression ratio of the ICE; changing the air-fuel ratio into the ICE, changing the fuel supply strategy including fuel injection timing and quantity of the ICE, and altering the valve timing and lifting of valves of the ICE.

When the selected predetermined combustion mode-switching operating point of the ICE produces insufficient torque to prevent ICE speed from decreasing, the EM1 acts as a motor and drives the ICE to thereby maintain the selected predetermined combustion mode-switching operating point of the ICE. When EM1 is acting as a motor, the battery supplies electric power to the EM1 for driving both the ICE and driving wheels of the HEV during combustion mode transition.

When the selected predetermined combustion mode-switching operating point of the ICE produces torque that would cause ICE speed to increase, the EM1 acts as a generator and loads the ICE to thereby maintain the selected predetermined combustion mode-switching operating point of the ICE. When EM1 acts as a generator, the battery absorbs the electric power of the EM1 for loading the ICE. The ICE provides torque to driveEM1 and driving wheels of the HEV during combustion mode transition.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

More than 20 years ago, hybrid electric vehicles (HEVs) began to appear on the market. This kind of vehicle uses a traditional internal-combustion engine (ICE) as the power source. However, its powertrain has integrated batteries and electric machine(s) besides the transmission or geartrain. The electric machine can be operated in an electrical power generating mode, i.e., as a generator in which rotational power from the engine or vehicle, in cases of regenerative braking, is extracted to produce electrical power that is stored in the battery. In other cases, the electric machine is operated as a motor to drive the vehicle, either partially or fully supplanting the ICE as the power source to propelling the vehicle. The battery is a device which stores electric energy from or supplies electric power to the electric machine, depending on the operating mode.

Figure 1A:
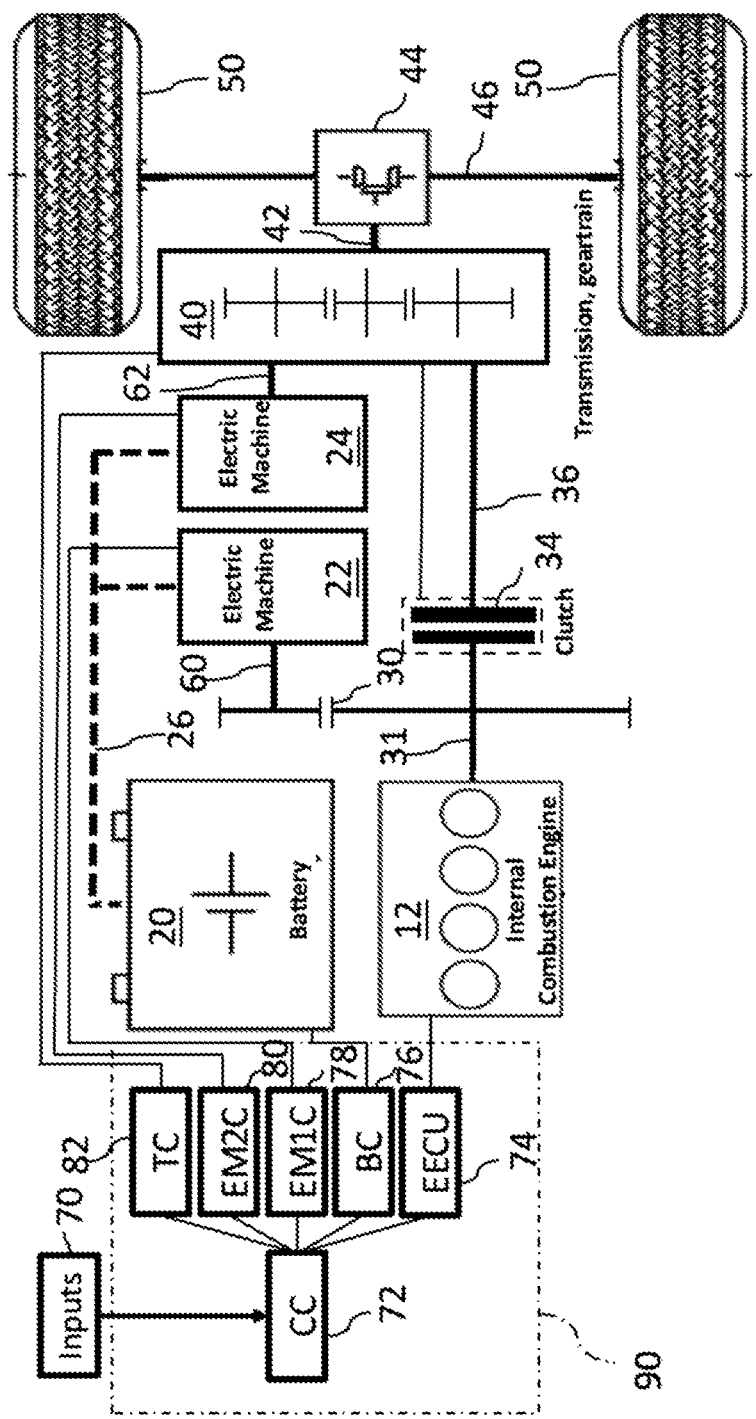
FIGS. 1a-d show embodiments of series-parallel hybrid electric vehicles in schematic form.

FIG. 1a is a schematic representation of a series-parallel HEV that includes an ICE 12 and two electric machines 22 and 24. Propulsion provided to driving wheels 50 can be provided by ICE 12 alone or by ICE 12 and electric machine 22 together when a clutch 34 is engaged. That is, ICE 12 or ICE 12 and electric machine 22 both provide torque to one side of clutch 34 via a shaft 31. When engaged, torque is transmitted to shaft 36 connected to a transmission 40 and then at an output shaft 42 of transmission 40. Shaft 42 connects to a differential 44 that connects to half-shafts 46, which then drive wheels 50 (in parallel hybrid configuration). In such operating mode, the parallel hybrid can be configured without electric machine 24. When electric machine 24 connects to transmission 50 via shaft 62. Electric machine 24 can also provide torque to drive wheels 50 when clutch 34 is engaged. Or, in another operating mode, clutch 34 is disengaged and propulsive torque to driving wheels 50 is only provided by electric machine 24, electric machine 22 loads ICE 12 to generate electrical power supplying electric machine 24 and charging battery 20 (in series hybrid configuration).

Both electric machines 22 and 24 are electrically coupled to a battery 20 via cables 26. Electric machine 22 is linked to ICE 12 via shaft 60, which has a gearset 30, and shaft 31. Electric machine 22, if unloaded, is simply rotating in relation with ICE 12. If loaded, i.e., meaning electric machine 22 is in generator mode, electric machine 22 draws torque from ICE 12 thereby generating electricity which is stored in battery 20. Electric machine 22 can alternatively act as a motor to start ICE 12 when clutch 34 is disengaged or to drive ICE 12, for example when ICE 12 is going through a combustion mode transition. This is called a parallel HEV because it can be driven by both together or by an electric machine or by an ICE solely.

In addition to mechanical hardware, the HEV in FIG. 1a also includes a variety of electronic hardware. An engine electronic control unit (EECU) 74 is coupled to ICE 12. Control of ICE 12 is covered in more detail below. A battery controller 76 is coupled to battery 20. Battery controller 76 receives signals from battery 20 concerning temperatures and state of charge in individual cells of battery 20, and current and voltage rate during charge and discharge. From these data, battery controller determines operating parameters to protect the battery, e.g., to avoid overtemperature. Such information, in some instances, is used to limit the rate of discharge or charge of battery 20 or indicate state of charge of battery 20, which affects operating mode of the HEV. A first electric machine controller 78 is coupled to electric machine 22; and a second electric machine controller 80 is coupled to electric machine 24. Controllers 78 and 80 control whether their respective electric machines are operating as a generator or a motor and how much current is provided to the windings to control the level of torque provided by or absorbed by the electric machine. A transmission control 82 is electronically coupled to transmission 40. In many control cases, the signals by which the controller communicates actually communicates with a device driver, to affect the desired control. Such device drivers are well known to those skilled in the art and are not separately shown here for clarity's sake. Of course, the controllers 72, 74, 76, 78, 80, and 82 can be separate units or combined into a single controller or a plurality of controllers with overlapping functionality. The controllers are shown grouped a vehicle system controller (VSC) 90. Also, inputs 70 are shown being provided to coordination controller 72; such illustration is not intended to be limiting. Inputs 70 may be provided directly to any of the controllers directly; and, all of VSC 90 controllers are interconnected allowing data sharing. As many of decisions to be made, e.g., appropriate gear for transmission 40 to be in depends on other factors such as engine rpm and whether electric machine 22 is in generator/motor mode, and other factors are interrelated, a coordination controller 72 is also provided. Coordination controller 72 communicates with all the other controllers. Furthermore, the coordination controller is provided other inputs 70 such as temperatures, pressures, accelerator pedal position, humidity, navigation information, as just a few examples. Alternatively, inputs 70 may be provided to the relevant controller directly, e.g., humidity might be relevant to EECU 74 only and might be provided to such controller directly. Inputs 70, are alternatively called sensors.

Figure 1B:
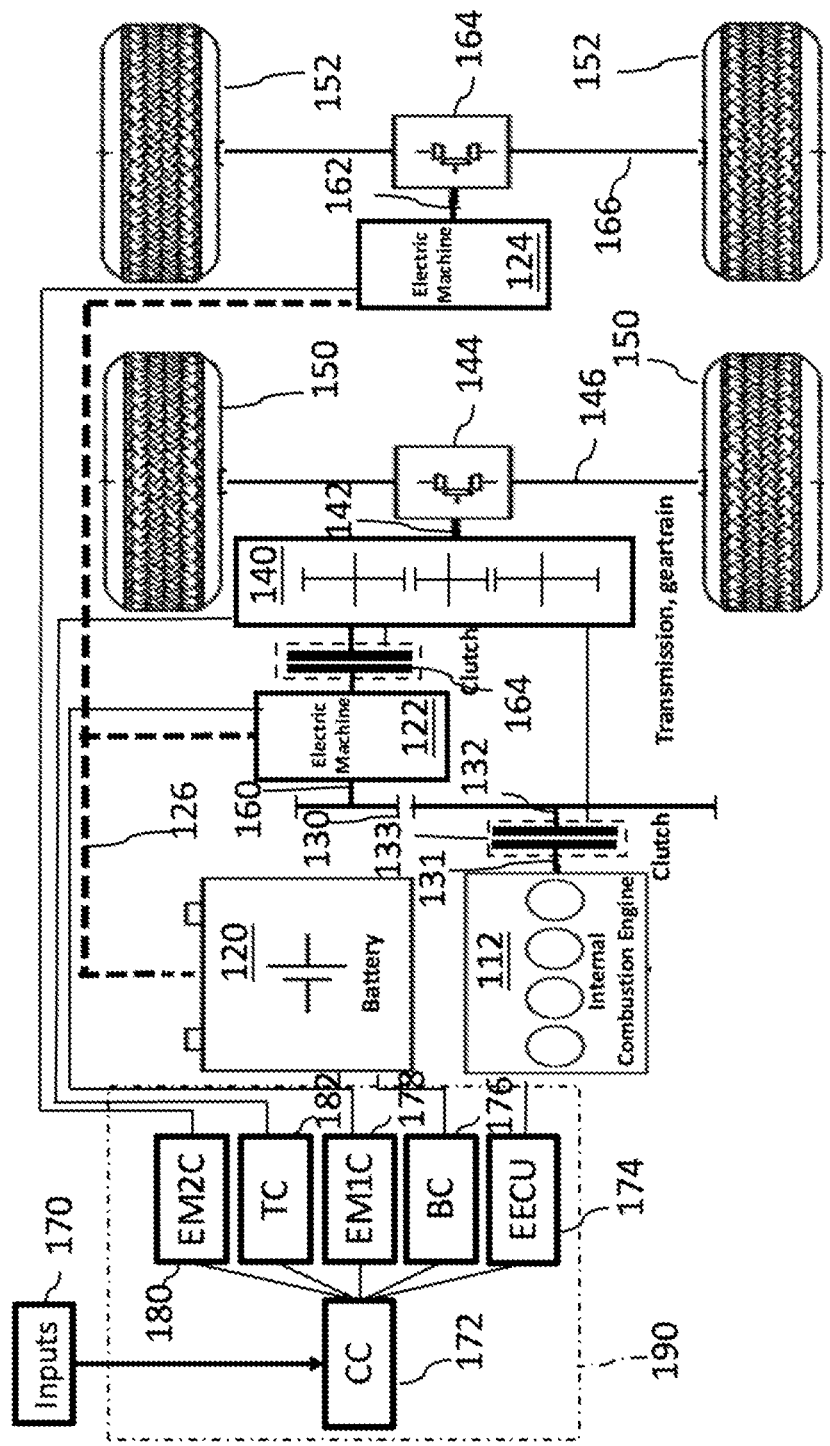

In FIG. 1*b*, an alternative HEV has two sets of driving wheels 150 and 152. Wheels 152 are driven only by an electric machine 124 in a motor mode or electric machine 124 can brake wheels 152 when electric machine 124 operates in a generator mode. Electric machine 124 connects to wheels 152 via a shaft 162, a differential 164, and half-shafts 166. Wheels 150 are driven by one or both of an ICE 112 and an electric machine 122. ICE 112 drives wheels 150 when a clutch 133 and a clutch 164 are engaged thereby coupling shaft 131 and 132. Shaft 132 is connected to a transmission 140 through gearset 130 and shaft 160, which connects to a differential 144 via a shaft 142. Differential 144 connects to driving wheels 150 via half-shafts 146. Electric machine 122 is linked to ICE 112 when clutch 133 is engaged. A gear set 130 is provided between electric machine 122 and ICE 112 via shafts 160, 131, and 132. Electric machines 122 and 124 are electrically coupled to a battery 120 via cables 126. Analogously to FIG. 1*a*, the HEV in FIG. 1*b* has an ICE controller 174, a battery controller 176, electric motor controllers 178 and 180, a transmission controller 182, and a coordination controller 172. Such controllers are electronically coupled to their respective elements, e.g., battery controller 176 with battery 120, either directly or indirectly through a device driver. Such an arrangement as shown in FIG. 1*b* allows driving wheels 150 and 152 by electric machines 122 and 124 solely when clutch 133 is disengaged and driving wheels 150 solely by ICE 112 when clutch 133 is engaged and electric machine 122 is passive, i.e., no current provided to coils of electric machine 122, so that while it rotates, it doesn't drive or load ICE 112, except for friction in the system. And, both electric machines 122 and 124 and ICE 112 can be used to drive the vehicle simultaneously. If embodiments where electric machine 124 is eliminated forms a parallel HEV. In embodiments where clutch 164 is disengaged, clutch 133 is engaged, and the HEV is propelled by electric machine 124 solely forms a series HEV.

Figure 1C:
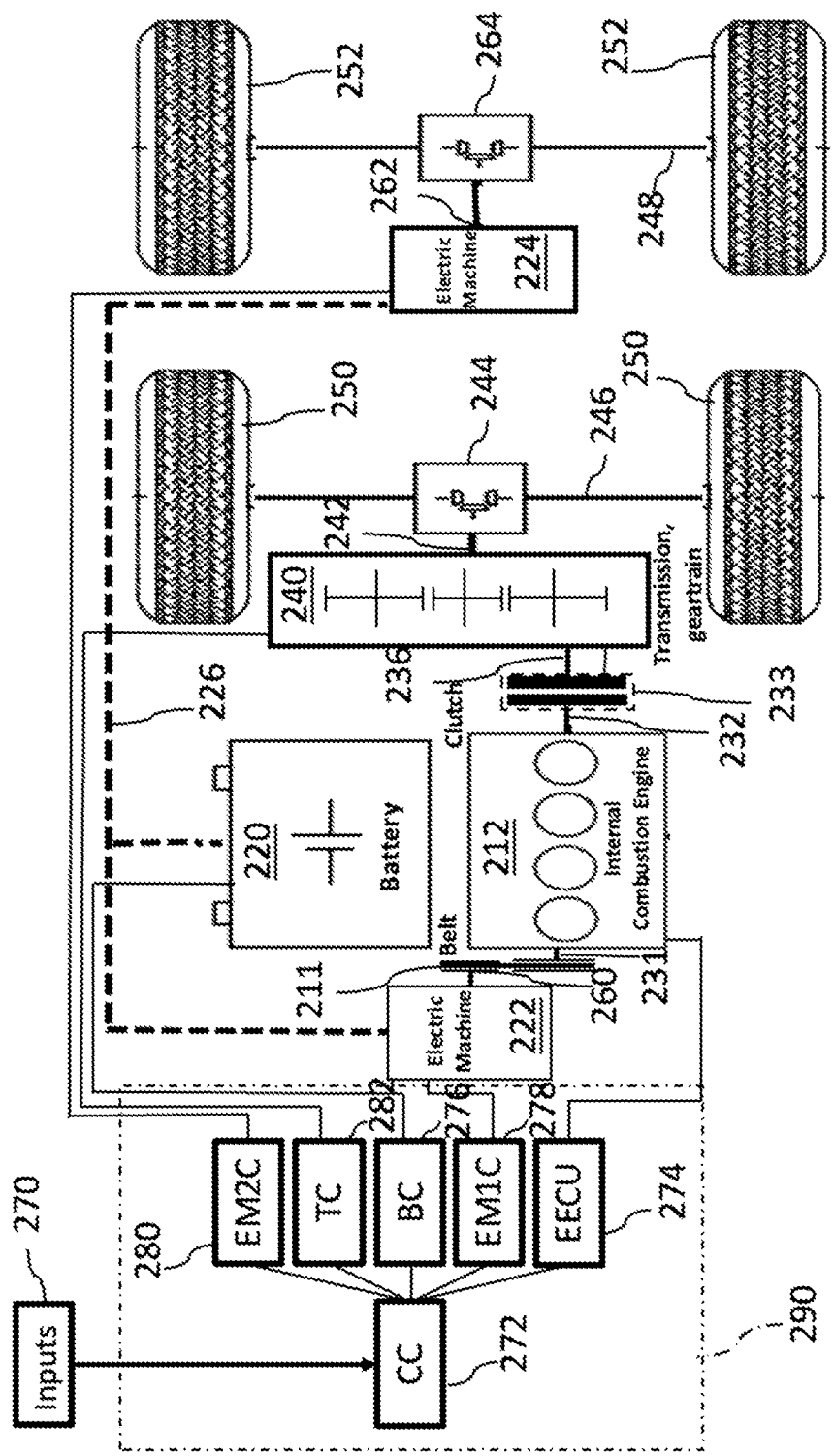

In FIG. 1*c*, an alternative HEV is shown in which both sets of wheels 250 and 252 are capable of being driven. Wheels 252 are driven only by an electric machine 224 in a motor mode or electric machine 224 can brake wheels 252 when electric machine 224 operates in a generator mode. Wheels 250 are driven by an ICE 212 when a clutch 233 that couples a shaft 232 with shaft a 236 is engaged. Shaft 236 is coupled to a transmission 240 that couples via a shaft 242 to a differential 244 that couples to half-shafts 246 that are connected to wheels 250. An electric machine 222 is coupled to ICE 212 via a belt drive system 260. If belt drive system 260 is a toothed belt is possible for ICE 212 to drive electric machine 222 or electric machine can drive ICE 212. Analogous to FIG. 1*a*, if electric machine 224 is eliminated, in an alternative embodiment, the resulting configuration is a pure parallel HEV. In embodiments where clutch 233 is disengaged and the HEV is propelled by electric machine 224 solely forms a series HEV.

The controller situation in FIG. 1*c* is analogous with the controller situation in both of FIGS. 1*a* and 1*b*. HEV of FIG. 1*c* has a EECU 274, a battery controller 276, electric machine controllers 278 and 280, a transmission controller 282, and a coordination controller 272 with inputs 270 from sensors.

Figure 1D:
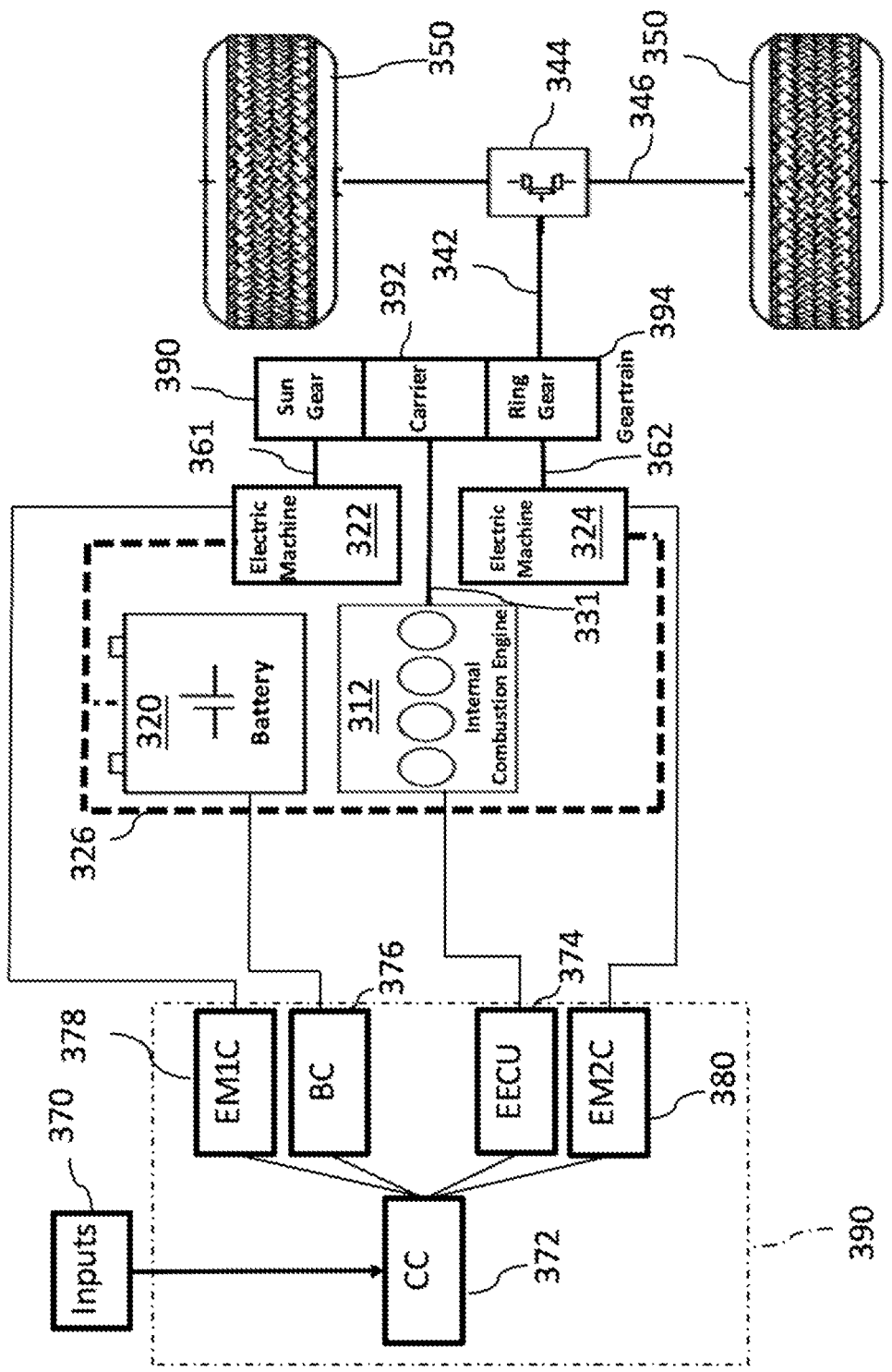

In FIG. 1*d*, an alternative HEV has a planetary gearset geartrain in which the ICE 312, electric machine 322, electric machine 324 and wheels 350 are mechanically connected. Wheels 350 can be driven by both ICE 312 via shaft 331 and electric machine 324 via shaft 362 simultaneously or individually. In series hybrid mode, electric machine 322 in generator mode via shaft 361 can be driven by ICE 312 via shaft 331 to supply electric power to electric machine 324 or charge the battery 320. In parallel hybrid mode, both electric machine 324 via shaft 362, and the ICE 312 via shaft 331 can propel the wheels 350 through the planetary geartrain. The planetary geartrain connects to wheels 350 via a shaft 342, a differential 344, and half-shafts 346.

The controller situation in FIG. 1*d* is analogous with the controller situation in FIGS. 1*a-c*. HEV of FIG. 1*d* has a EECU 374, a battery controller 376, electric machine controllers 378 and 380, and a coordination controller 372 with inputs 370 from sensors.

The HEVs in FIGS. 1*a-d* can be operated in a parallel mode, meaning the ICE and the electric machine can both propel the vehicle. The HEV can be operated in a series mode in which the mechanical connection between the engine and the driving wheels is disconnected via a clutch as shown in FIG. 1*a*-1*c*, or the wheels are not driven by the engine through a power split mechanism and control as shown in FIG. 1*d*.

Figure 2:
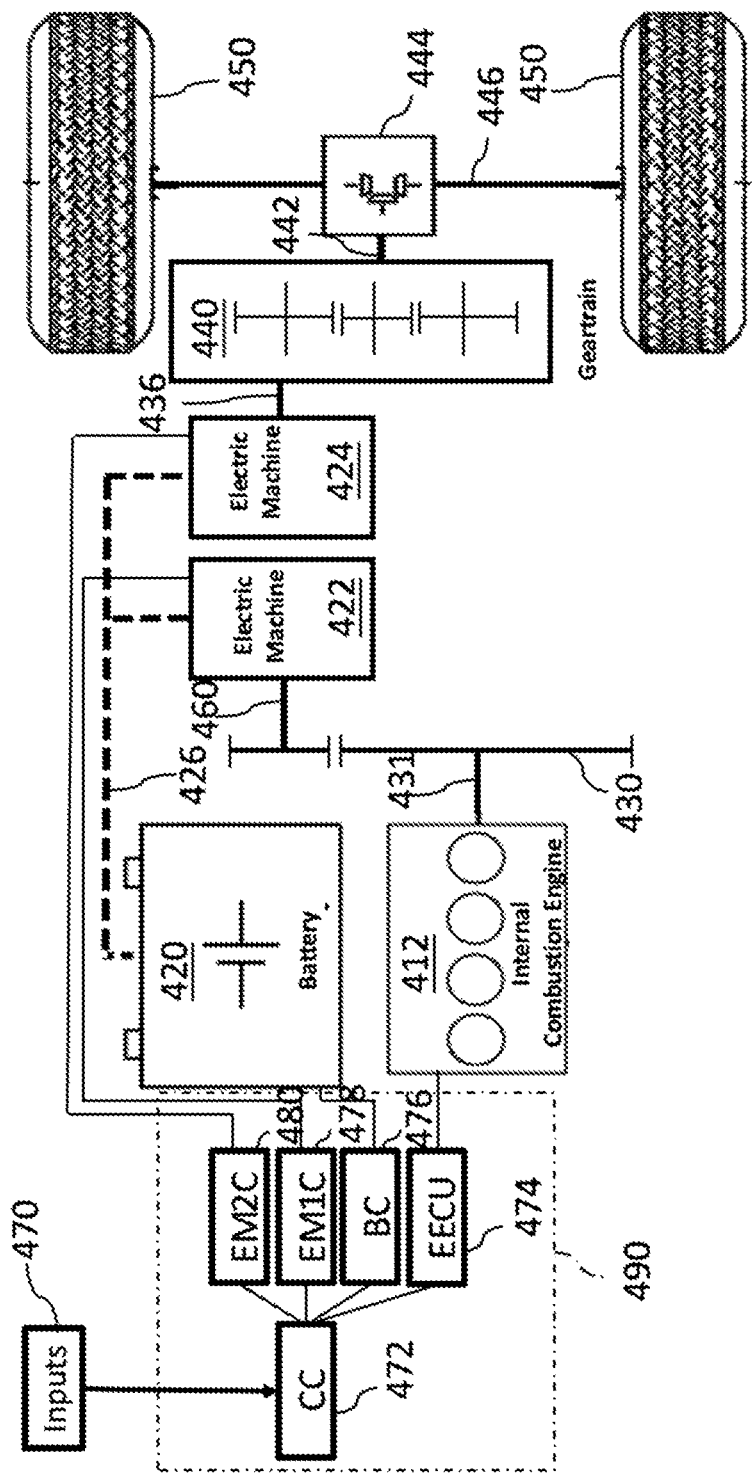
FIG. 2 is a schematic representation of a series hybrid electric vehicle.

In a series configuration, there is never direct mechanical connection between engine and vehicle drive system, it is called range extender sometimes, and the vehicle is driven by the electric machine alone. Such a system is shown in FIG. 2, in which wheels 450 are driven only by an electric machine 424 in a motored mode. In certain operating modes, such as regenerative braking, electric machine 424 operated in a generator mode. Electric machine connects to wheels 450 via a shaft 442, a differential 444, and half-shafts 446. ICE 412 and electric machine 422 are linked via shaft 431 and 460 as well as gearset 430, in which ICE 412 drives electric machine 422 to generate electrical power to supply electric machine 422 and charge battery 420. Wheels 450 are driven only by an electric machine 424 in a motor mode; or, electric machine 424 can brake wheels 450 when electric machine 424 operates in a generator mode via shaft 436. Shaft 436 connects electric machine 424 to geartrain 440, which connects to a differential 444 via a shaft 442. Differential 444 connects to driving wheels 450 via half-shafts 446. Electric machines 422 and 424 are electrically coupled to a battery 420 via cables 426. Analogously to FIG. 1a, the HEV in FIG. 2 has an engine controller 474, a battery controller 476, electric motor controllers 478 and 480, and a coordination controller 472. Such controllers are electronically couple to their respective elements, e.g., battery controller 476 with battery 420, either directly or indirectly through a device driver. The arrangement in FIG. 2 allows providing propulsion to driving wheels 450 by electric machine 424 solely.

The electronic controllers in all of FIGS. 1a-d and 2 are show as discrete units. These can be housed together. Or, a single controller could be used to manage the functions of two or more of the controllers shown discretely. Alternatively, the functions in one of the discrete controllers are shared among two controllers. For the purpose of this application, the processing capability shown in FIGS. 1a-d and 2 can be considered as a vehicle system controller (VSC) (90 in FIG. 1a, 190 in FIG. 1b, 290 in FIG. 1c, 390 in FIG. 1d, and 490 in FIG. 2).

The VSC comprises a plurality of controllers that are in communication with each other. One of the plurality of controllers is a coordination controller (CC) which coordinates the other controllers.

Although not illustrated as such in any of FIGS. 1a-d or FIG. 2. In other embodiments, the functions of the multiple electronic controllers in FIGS. 1a-d and FIG. 2 are provided by any suitable combination of processing units.

It is known by one skilled in the art, that the electronic controllers provide signals to device controllers which manage the various elements of the HEV. For example, the signal from an EECU to control the amount of fuel provided to the ICE is at signal voltage levels and is provided to a device driver that has the electrical capability to command a pulse width to the fuel injector. Those skilled in the art that the VSC, meaning the many controllers that are coordinating control, are only providing the signals to intermediary devices to control the elements of the HEV such as the battery, the ICE, etc.

If the battery of the above-described hybrid systems cannot be charged externally, they are called hybrid electric vehicle (HEV). If battery of the above-described hybrid systems can be charged by external electric source and the electric machine of the above-described hybrid systems has sufficient power to drive vehicle, they are called plug-in hybrid electric vehicle (PHEV). Herein, the term HEV refers to both a conventional HEV and a PHEV as they both rely on an ICE and EM with the only difference being able to top of the battery via an electric plug and possibly battery capacity.

A vehicle using electric machine to drive has obvious advantages in response to vehicle driving power demand, such as high torque output at low-speed, smooth speed regulation, fast response time and high efficiency. Also, electric machine can better meet driver random demand to make large and rapid changes in output power based on road and traffic conditions.

Current (plug-in) hybrid electric vehicles mainly use SI gasoline engines or CI diesel engines. The electric machine as a motor/generator and the battery for electric energy storage and discharge. The ICE is regulated to operate at a low fuel consumption operating point. The electric machine supplements the ICE for propulsion at the driving wheels or in other operating points the electric machine is operated as a generator to recover energy from the vehicle such as in vehicle deceleration and braking. In urban points, the fuel consumption of hybrid electric vehicles can be significantly lower than that of traditional engine vehicles. Some Plug-in hybrid electric vehicles (PHEV) have full-electric range (AER), so electric energy from the power grid is used for driving vehicle instead of hydrocarbon fuels thereby further reducing fuel consumption.

Figure 3:
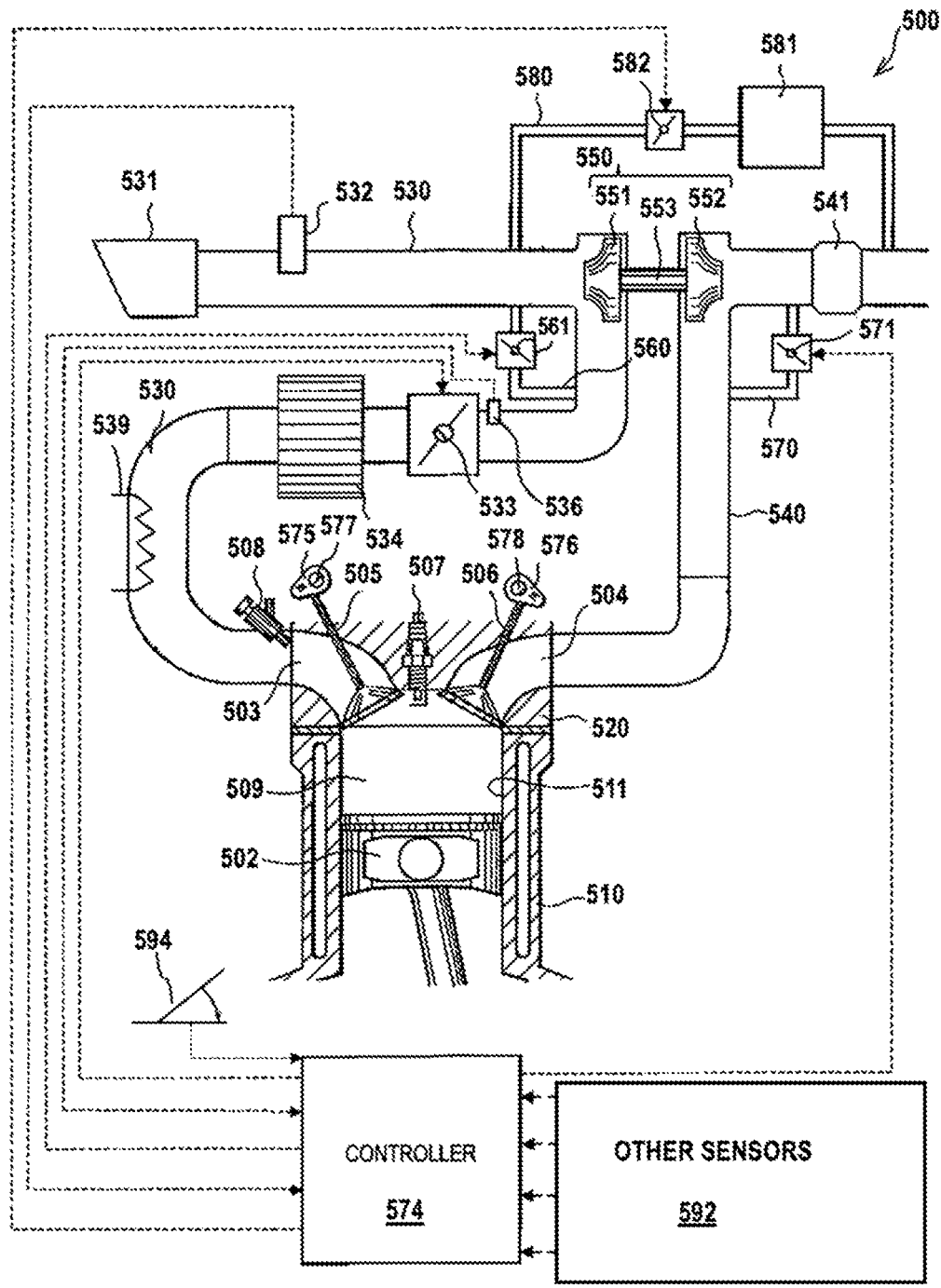
FIG. 3 is a schematic representation of a single cylinder of an internal-combustion engine.

FIG. 3 shows a single cylinder of an internal-combustion engine (ICE) 500 in a schematic drawing. Such ICE is one alternative for ICEs 12, 112, 212, 312, and 412 in the preceding figures. The engine in the HEVs in FIGS. 1a-d and 2 are most likely multi-cylinder engines. The schematic in FIG. 3 shows only one cylinder of such an engine for clarity purposes. ICE 500 has an intake passage 530, an exhaust passage 540, and a turbocharger 550. ICE 500 has a cylinder block 510 and a cylinder head 520. Within cylinder block 510 is a cylinder 511 in which a piston 502 reciprocates. A combustion chamber 509 is defined by cylinder head 520, top of piston 502, and the surface of cylinder 511.

Cylinder head 520 has an intake port 503 and an exhaust port 504. Intake port 503 supplies intake air to combustion chamber 509. Exhaust gases are discharged from combustion chamber 509 through exhaust port 504. Flow in and out of combustion chamber 509 is controlled via an intake poppet valve 505 in intake port 503 and an exhaust poppet valve 506 in exhaust port 504.

A cam 575 opens and closes intake valve 505. Analogously, a cam 576 opens and closes exhaust valve 506. Cams 575 and 576 are coupled to camshafts 577 and 578, respectively. In some embodiments, camshafts 577 and 578 rotate in a fixed relationship with the crankshaft (not shown in FIG. 3). In variable-valve-timing embodiments, camshafts 577 and 578 have some limited range of authority to move independently of the crankshaft so that the opening and closing times of the cams on that crankshaft is adjustable.

Cylinder head 520 has a centrally-located spark plug 507. Spark plug 507 can be positioned at other locations within combustion chamber 509.

In the embodiment in FIG. 3, a turbocharger 550 is provided to pressurize the intake air. In other embodiments contemplated by the inventor of the present disclosure, the internal combustion engine is not pressure charged, obviating turbocharger 500 and associated hardware. Turbocharger 550 includes a compressor 551, a turbine 552, and a shaft 553 that couples compressor 551 with turbine 552. Energy in exhaust gases is extracted by turbine 552 which is located in exhaust passage 540. Via shaft 553, compressor 551 is caused to rotate and thereby pressurize intake air within intake passage 530. Intake passage 530 also has an intake air filter 531 (for removing unwanted particles or droplets that could harm engine 500 from the intake air), an airflow meter 532 (for measuring the amount of air passing through air passage 530), a pressure sensor 536, a throttle 533 (for controlling the amount of air entering ICE 500), and an intercooler 534 (for cooling intake air that has been heated via compressor 551).

In some applications, engine 500 operates in a combustion mode in which intake air heating is desirable. An intake air heater 539 is disposed in intake passage 530.

A fuel injector 508 is disposed in intake passage 530 shown just upstream of intake port 503 in FIG. 3. In other embodiments, fuel injector 508 is disposed in intake port 503. In both of these locations, fuel injector 508 is a relatively low-pressure injector. In yet other embodiments, fuel injector 508 is a high-pressure injector with a tip of fuel injector 508 located within combustion chamber 509. Such a configuration is called direct injection. In some embodiments, both a fuel injector located within intake passage 530 and a fuel injector located within combustion chamber 509 are provided. Such a configuration not only accommodates use of different fuels of different characteristics to be used, but also accommodates use of different fuel injection strategies for some combustion mode control applications (such as SACI).

In intake passage 530 between throttle 533 and compressor 551, a pressure sensor 536 is provided to measure the supercharge pressure in intake passage 530. In some embodiments, a pressure sensor is also provided in intake passage downstream of throttle 533.

A catalytic converter 541 is provided in exhaust passage 540 downstream of turbine 552. In other embodiments, other exhaust aftertreatment devices, such as lean NOx traps or particulate filters, are provided in exhaust passage 540 in place of or in addition to catalytic converter 541.

In some embodiments, ICE 500 has an intake circulation passage 560 with an intake recirculation valve 561. Valve 561 is opened when pressure of the air received from compressor 551 is higher than desirable.

ICE 500 has a wage gate valve 571 disposed in bypass passage 570. Bypass connects to exhaust passage 540 on an upstream side of turbine 552 and a downstream side of turbine 552. Waste gate valve 571 controls the pressure provided to turbine 552, and thereby controls the speed of turbine 552 of turbocharger 550, to a suitable level.

ICE 500 also has an exhaust gas recirculation (EGR) system that includes: an EGR passage 580 that couples exhaust passage 540 (downstream of turbine 552) with intake passage 530 (upstream of compressor 551), an EGR valve 582 to control the amount of EGR flowing from exhaust to intake, and an EGR cooler 581. EGR is used to dilute intake air with exhaust gas both as a measure to reduce the combustion temperature in cylinder 509 to thereby reduce nitrogen oxide (NOx) formation. EGR also improves engine efficiency by reducing the level of throttling losses. Also, in some combustion modes, exhaust gas dilution of the intake mixture is needed to control the speed of the combustion event. Combustion that is too rapid (autoignition) can be: noisy and counterproductive because it occurs at the wrong time in the cycle. Furthermore, autoignition leads to overheating of combustion chamber surfaces, which if left unchecked can melt surfaces and destroy engine 500.

EGR cooler 581 reduces the temperature of the recirculated exhaust stream in the intake so that the combustion event produces less NOx, which is notoriously sensitive to temperature.

ICE 500 includes an engine electronic control unit (EECU) 574 that: is provided signals from sensors, computes a desired operating point based on the sensor data, and command operation to actuators associated with the engine. Signals come from: airflow sensor 532, intake pressure sensor 536, and other sensors 592. Other sensors include any of: an engine crank angle sensor from which engine speed and engine position is determined; an accelerator pedal position sensor to determine an operator's desire for propelling the vehicle; a brake pedal sensor; a humidity sensor; temperature sensors (engine coolant, air temperatures, EGR temperature, etc.), pressure drop sensors (such as across air filter 531), pressure sensors, valve position sensors, etc. In an autonomous driving mode, a desired operating point for the engine may be determined via another controller or within EECU 574. EECU 574 may communicate with other controllers, such as a transmission controller, an electric machine controller, and a battery controller. Even a coordination controller is included in some embodiments.

Based on sensor data and other information provided to EECU 574 determines the appropriate operating point of engine 500, such as: fuel injection timing and quantity, spark plug 507 timing, throttle valve 553 position, EGR valve 582 position, waste gate valve 571 position, intake recirculation valve 561 position, intake heating via heater 539, opening/closing time of poppet valves 505 and 506, etc.

An accelerator pedal 594 provides a signal to a controller 574. Such controller 574 is the EECU (74 in FIG. 1*a*, 174 in FIG. 1*b*, 274 in FIG. 1*c*, and 374 in FIG. 1*d*). Accelerator pedal 594 is how a vehicle operator indicates their desire to propel the vehicle. Alternatively, in an autonomous vehicle, the vehicle is controlled based on a desired route and other inputs such as traffic and obstacles. In the conventional HEV, the vehicle operator communicates their desired speed via accelerator pedal 594. The controller to which the accelerator pedal signal is coupled translates that request into a desired torque, which can be further translated to a torque request signal of a controller 574 in some operating mode. When the operator backs off on the accelerator pedal to slow down, the desired torque reduces and the vehicle slows down. When the operator pushes on the accelerator pedal, the desired torque increases and the vehicle speeds up.

As briefly mentioned above, ICE 500 can be operated in multiple combustion modes, some of which provide significantly decreased fuel consumption than conventional spark-ignition (SI) operation. Before describing how the HEV is used to assist in making transitions among SI and other combustion modes, alternative combustion modes are discussed below.

Homogeneous-charge, compression-ignition (HCCI) is a combustion mode of significant interest. Like a compression-ignition (CI) engine, combustion occurs spontaneously from high temperatures that occur from compressing the gases during the compression stroke. Also, like a compression-ignition engine, there is no throttling, i.e., a full charge of air is provided to the cylinder. In SI engines, the amount of air inducted into the engine is controlled via the throttle valve so that a precise ratio of fuel-and-air exists in the combustion chamber. By avoiding throttling, HCCI engines provide fuel economy approaching a CI engine. The time when the combustion starts is controlled by the time when the temperature of the mixture rises to the auto-ignition temperature, which is relatively difficult to control. Because the mixture is premixed and lean, little to no soot or NOx is produced in the combustion event with HCCI.

HCCI combustion can generally only be used in medium and low load conditions. This is because after the engine load and the fuel concentration of the mixture increase to a certain level, the combustion becomes rough and noisy. When the demand for torque from the ICE is above the suitable operating range for HCCI, a transition to SI or other combustion mode is made. Also, HCCI is not suitable during cold-start of the ICE due to the low engine body temperature and large heat transfer losses to the cold walls. SI combustion is appropriate at cold start with a transition to HCCI when the ICE is sufficiently warmed up and if the demanded operating point is suitable for HCCI.

There are different technical approaches to achieve HCCI combustion control. One solution called Controlled Autoignition (CAI) is to change the opening and closing time of the intake and exhaust valves under low load conditions, so that additional exhaust gas is trapped in the cylinder. The presence of a large amount of hot residual exhaust gas raises the temperature of the mixed gas in the cylinder, which can reach the autoignition temperature during the appropriate time in the compression stroke of the ICE and spontaneous combustion occurs.

Another solution, called Optimized Kinetic Process (OKP), is to increase the compression ratio of the engine to about 15:1, and it uses the heat of exhaust gas and coolant to heat intake air and enter the cylinder together with the unheated intake air. By controlling the ratio of the two airflows, the intake air temperature can be quickly adjusted, thereby controlling the combustion time of HCCI. Bench tests have proved that this scheme can greatly reduce fuel consumption, and the working range of HCCI is also relatively wide, which can cover medium and low load conditions commonly used in automobile engines.

Another combustion mode, spark-assisted, compression-ignition (SACI) related to HCCI, which can be used at higher torques than HCCI uses spark assist. The temperature of the air-fuel mixture to above the critical temperature that can be ignited and achieve flame propagation (still below the autoignition temperature), and then ignite it with a spark plug. The ignited mixture propagates through the flame to make more mixture participate in the combustion and release heat, causing the pressure and temperature in the cylinder to further increase, and the remaining unburned mixture reaches the auto-ignition temperature and spontaneous combustion occurs. This "ignition-induced homogeneous charge compression ignition" combustion mode can be used as a transition mode between the two combustion modes of HCCI and SI.

To reduce the minimum mixture temperature required for "ignition-induced homogeneous charge compression ignition" and to expand the temperature range of the mixture required for combustion control, the mixture near the spark plug can be locally enriched. For this reason, a small amount of fuel injection can be achieved during the compression cycle in the cylinder.

In addition, there are some other HCCI schemes, such as the use of variable compression ratios, the use of dual fuels, and so on. The temperature in the cylinder, and thus the timing of ignition in the HCCI engine can also be assisted by heating the intake air temperature.

Although HCCI and SACI combustion modes show great promise to provide a significant fuel consumption reduction and have been installed on fleet vehicles for testing, they have not been produced for commercial sale due to technical difficulties in controlling the combustion.

Because the control of HCCI is more complicated and challenging, for switching from the traditional combustion mode to the HCCI mode, it is necessary to carefully study the combustion mode-switching strategies and control algorithms in advance to understand clearly so that the control device can issue appropriate commands, let the engine control actuating devices adjust step by step. However, the number of engine operating points and engine thermal state before the mode switch are unlimited. Therefore, a careful study of all possible switching points in advance is too much work, which has become a major difficulty for the application of multi-combustion mode engines in automotive products.

Based on the above reasons, it is necessary to find an effective, reliable, stable, and practical engine combustion mode-switching strategies and control algorithms to realize the application of multi-combustion mode engine in automotive products.

Figure 4A:
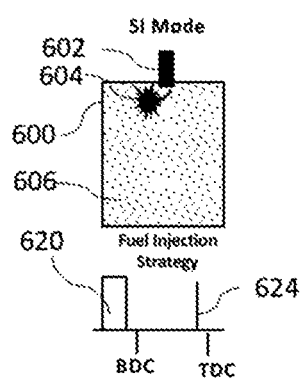
FIGS. 4a-c are representations of spark-ignition combustion mode; spark-assisted, compression-ignition combustion mode, and homogenous-charge, compression-ignition combustion mode, respectively.
Figure 4B:
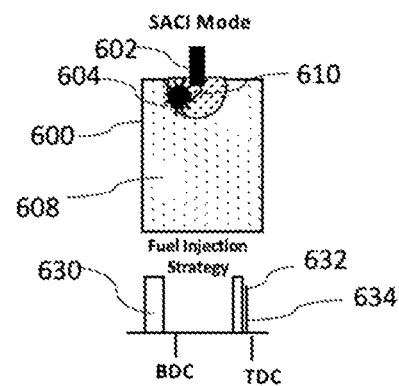
Figure 4C:
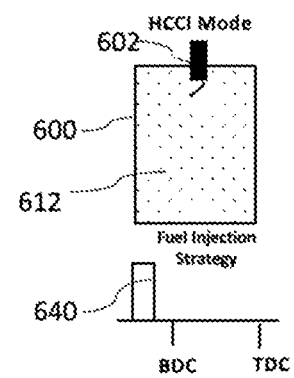

Referring to FIGS. 4a-c, several combustion modes are compared. Starting In FIG. 4a, SI combustion is illustrated. A combustion chamber 600 has a spark plug 602 which produces a spark kernel 604. The mixture in the combustion chamber 600 is illustrated as having a fairly high concentration of fuel 606. Below combustion chamber 600 is shown a timeline of events starting before bottom dead center (BDC) through the compression stroke that ends at top dead center (TDC) and slightly beyond. The fuel is injected before BDC to provide time for premixing to ensure a mostly uniform mixture of fuel and air. The fuel injection duration is illustrated as block 620. Spark firing 624 occurs just before TDC. SACI combustion is illustrated in FIG. 4b in which a spark kernel 604 is shown and two fuel mixture areas: a fuel rich area 610 and a leaner fuel area 608. In the lower part of the figure showing the timing of the events, some of the fuel is injected at 630 which is before BDC. Another small fuel charge is injected close to TDC at 632. Fuel injected at 630 gives rise to the premixed charge 608 and fuel injected at 632 gives rise to the rich area 610 near spark 604. In FIG. 4c, HCCI is illustrated. In cylinder 600 is a very lean mixture 612. There is no spark with HCCI. In the timing of the events show the fuel to be provided to cylinder 600 before BDC. At some HCCI operating points, the intake air is heated so that the mixture is warm enough, after compression of the mixture, to auto-ignite. At other operating points with a suitable range for HCCI, less or no intake heating of the mixture is needed for proper combustion. Although not illustrated, another option is to rotate engine shaft by the electric machine with no fuel injection and no spark ignition for engine control parameter adjustment, such as intake air temperature and compression ratio etc. during combustion mode transition. In such a case, the vehicle is propelled by the electric machine solely.

Although HCCI and SACI combustion are described herein, many vehicle manufacturers are investigating efficient combustion modes that are related to these combustion modes with slight differences. The inventor of the present disclosure contemplates any combustion mode-switching.

According to the present disclosure, a HEV including at least one electric machine, at least one battery, and a multi-combustion mode engine makes use of the inherent characteristics to achieve synergies by integrating the EM and ICE, as well as the battery, to access engine operating points during the transition that are known to be stable operating points through coordinated control of the EM and the ICE. During the transition, the output torque from the ICE does not need to follow the torque demand from the operator of the vehicle (the operator can be a person driving the vehicle or an autonomous controller) because the EM, backed by the battery, can make up torque if the ICE torque is less than demanded or absorb extra torque when the ICE torque is greater than demanded.

Determination whether to command a transition from the current combustion mode to the new combustion mode is based on at least one of: efficiency of the HEV operating in the new combustion mode being greater than efficiency of the HEV operating in the current combustion mode, operator demanded torque, the ICE being sufficiently warm, in some embodiments, or sufficiently cool, in other embodiments, to support stable combustion in the new combustion mode, and state of charge of the battery. For example, when the ICE is being operated after a cold start, it may not be possible to access HCCI combustion until the ICE is sufficiently warm due to unstable combustion. In another example, humidity has a large impact on combustion modes that are not initiated by a spark, i.e., autoignition. In some extra high-humidity environments, it may not be possible to access HCCI or SACI combustion at all, again due to unstable combustion.

Through coordinated control of the EM and the ICE when both are mechanically linked together, the ICE output torque or power is largely irrelevant to the torque at the driving wheels during the combustion mode-switching operation, i.e., the transition. During the transition, the ICE under the action of the EM is commanded to operate from any current ICE operating point to a combustion mode-switching operating point in same combustion mode.

The ICE combustion mode-switching operating point can be a single or a limited number of ICE operating points consisting of the ICE rotational speed and torque that have been predetermined in advance during system development. Based on the different ICE operating condition, one predetermined combustion mode-switching operating point can be selected. By attaining the selected predetermined combustion mode-switching operating points from any current ICE operating point, the ICE undergoes preparation to operate in a new combustion mode during the transition interval by following the ICE combustion mode-switching transition control strategies that have been predetermined in advance during system development.

The preparation to operate the ICE from a current combustion mode to a new combustion mode that include at least one adjustment or control of the ICE: the intake air temperature of the ICE, the pressure in the intake air system of the ICE, the exhaust gas fraction in intake air being inducted into the ICE, the compression ratio of the ICE, the air-fuel ratio into the ICE, the fuel supply strategy including fuel injection timing and quantity of the ICE, the ignition timing of the ICE, and altering the valve timing and lifting of valves of the ICE.

When the selected predetermined combustion mode-switching operating point of the ICE produces insufficient torque to prevent ICE speed from decreasing, the EM acts as a motor and drives the ICE to thereby maintain the selected predetermined combustion mode-switching operating point of the ICE.

When the selected predetermined combustion mode-switching operating of the ICE produces torque that would cause ICE speed to increase, the EM acts as a generator and loads the ICE to thereby maintain the selected predetermined combustion mode-switching operating point of the ICE.

After the ICE operation meets the new combustion mode switch condition by completing preparation and following the ICE combustion mode-switching transition control strategies, the ICE is commanded to operate in the new combustion mode.

The ICE is operated in the new combustion mode range. The ICE operating point can be controlled to any target operating point as need under the new combustion mode.

During the combustion mode-switching transition, the ICE operation maybe abnormal, such as the gas work fluctuation in the cylinder, which could cause the ICE output power including the ICE rotational speed and torque unstable, fluctuation or even interruption. However, through the coordination control of the EM and the ICE when the both are linked mechanically, the EM and the battery can absorb, compensate and suppress those fluctuation or even interruption to maintain required combustion mode-switching operation point, i.e., the ICE rotational speed and torque. Therefore, the present invention not only ensure the smooth combustion mode-switching transition but also ensure the total output power or the resulting torque of the ICE and the EM and any additional EM(s) connected to driving wheels of the vehicle to meet the vehicle driving power or torque demand.

In addition, the ICE can be controlled in some efficient and stable operating range or limited operating points to avoid some operating regions or threshold where the combustion and emission control are difficult. For example, when the ICE operating points under HCCI combustion mode are close to the upper or the lower threshold of its operating range, such as the overlap area 664 of SACI and HCCI as shown in FIG. 6b, the control of combustion and post-treatment of emission become difficult.

Due to the limited number of predetermined combustion mode-switching operating points, it is possible to select one or limited ICE operating points, at least one operating point that is required in advance during the system development, and carefully optimize the combustion mode-switching strategies and control algorithms. For example, it includes but not limited to the development of multiple set of control instructions to perform a sequence adjustment of the ICE control devices or actuators selectively for how to deal with slight deviation in the ICE combustion mode-switching points or the ICE thermal conditions during switching the combustion mode. After completing the combustion mode-switching operation, the ICE will be operated under the new combustion mode.

Figure 5:
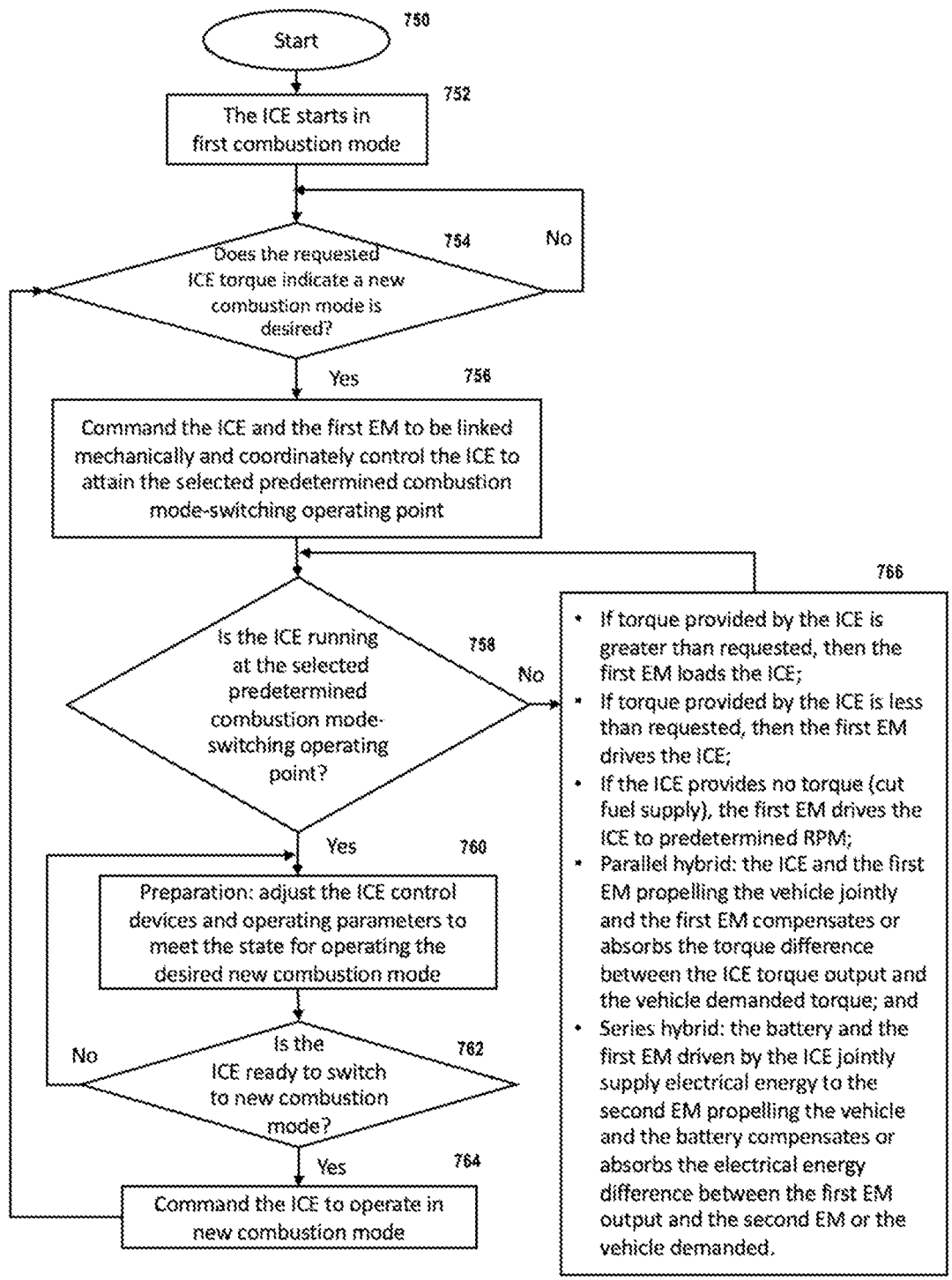
FIG. 5 is a flowchart showing a transition from one combustion mode to another.

Referring now to FIG. 5, a flowchart shows the processes involved in making a transition from one combustion mode to another. The process starts in 750 and warms up in the first combustion mode, which in a gasoline engine is likely to be normal spark-ignition mode, such as is illustrated in FIG. 4a. Once the ICE is warmed up, control passes to block 754 in which it is determined whether a requested torque in a new combustion mode is desired. If no, control goes back to block 754 to continue to wait until a combustion mode transition is desired or recommended. If yes, control passes to block 756 in which a selected predetermined combustion mode-switching transition operating is commanded: link the ICE and the first EM mechanically and coordinately control the ICE to the selected predetermined combustion mode-switching operating point under the action of the first EM. The selected predetermined combustion mode-switching operating point is one that allows the ICE to prepare to operate in the desired new combustion mode, including the ICE control devices and operating parameters adjustment during the transition interval. To attain the selected predetermined combustion mode-switching operating point, the ICE may not provide the requested torque.

The control goes to block 766: If torque provided by the ICE is greater than requested, then the first EM acts as a generator to load the ICE. If torque provided by the ICE is less than requested, then the first EM acts as a motor to drive the ICE. If the ICE provides no torque (cut fuel supply), the first EM drives the ICE to the selected predetermined combustion mode-switching point of the ICE with predetermined RPM and zero torque. For parallel hybrid, the ICE and the first EM propelling the vehicle jointly and the first EM compensates or absorbs the torque difference between the ICE torque output and the vehicle demanded torque. For series hybrid, the battery and the first EM jointly supply electrical power to the second EM propelling the vehicle and the battery supplies or absorbs the electrical power difference between the first EM output and the second EM demanded (the vehicle demanded).

When the ICE is running at the selected predetermined combustion mode-switching operating point stably, the control goes to block 760, the ICE undergoes preparation to operate in the desired new combustion mode by adjusting the ICE control devices and operating parameters to meet the conditions for operating the desired new combustion mode. The preparation includes at least one adjustment of: the intake air temperature of the ICE, the pressure in the intake air system of the ICE, the exhaust gas fraction in intake air being inducted into the ICE, the compression ratio of the ICE, the air-fuel ratio into the ICE, the fuel supply strategy including fuel injection timing and quantity for the ICE, the ignition timing of the ICE, and altering the valve timing and lifting of valves of the ICE.

Once preparation is completed, control passes to block 762 in which it is determined whether the ICE is ready to switch to the new combustion mode. If no, control goes back to block 760 to continue preparation until switching combustion mode condition is ready. If yes, control goes to block 764 and commands the ICE to operate in the new combustion mode.

During the ICE operation in block 764, control continues going to block 754 to determine whether the requested ICE torque indicate a new combustion mode is desired. If no, the ICE keeps in block 764 to operate in the current combustion mode. If yes, control goes to block 756.

The transition interval can be a very short period of a few cycles. For example, in some combustion mode-switching, the pressure in the intake manifold has to increase, which takes a few ICE revolutions. In another example, in a transition to HCCI combustion, the intake manifold is heated by electrical resistance heating or other heating methods, which can take a matter of seconds. Control passes from block 760 to 762 in which it is determined whether the ICE parameters that are to be changed to support combustion in the new combustion mode have achieved the change necessary. That is, is the ICE ready to stably switch to the new combustion mode? If no, control passes to block 760 for continuing in the transition mode. This loop continues until the parameters, such as intake temperature, effective compression ratio, intake pressure, and exhaust gas recirculation, etc. that result in stable combustion in the new combustion mode are achieved, so that control passes to block 764 for commanding the ICE to change to the new combustion mode. Control passes back to block 754 to waiting for a change in torque that indicates that another transition is desired. Again, of no indication that a transition should be made, control stays at the combustion mode in which it is operating until a positive result in block 754.

Figure 6A:
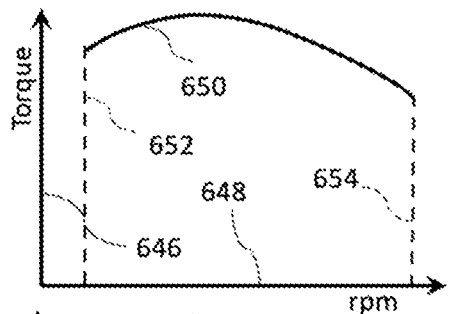
FIGS. 6a-d, 7a, 7b, 8a, and 8b show graphs of example transitions from a current combustion mode to a new combustion mode according to embodiments of the present disclosure.
Figure 6B:
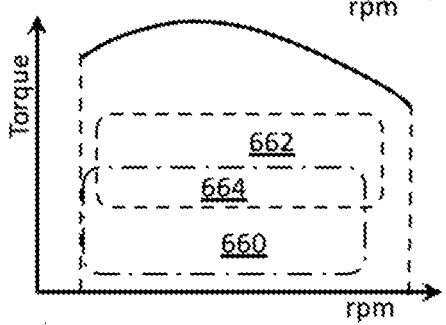

In FIG. 6a the operating range of a typical SI engine is shown on a graph of engine torque 646 vs. engine speed 648. The maximum torque that the ICE can develop as a function of speed is shown as curve 650. The operating range under curve 650 between lowest engine speed 652 and highest engine speed 654 can be accessed with SI combustion. However, as mentioned before, it is desirable to operate in higher fuel efficiency combustion modes when possible. In FIG. 6b, superimposed over the SI range (enclosed by lines 648, 650, 652, and 654) is HCCI at low torque levels is shown within dash-dot lines 660 and SACI at medium torques is shown within dashed lines 662. Within area 660, either HCCI or SI operation can be used. Within area 662, either SACI or SI operation can be used. And, within area 664, the overlap between HCCI and SACI operation, any of SI, HCCI, and SACI operation can be chosen.

Figure 6C:
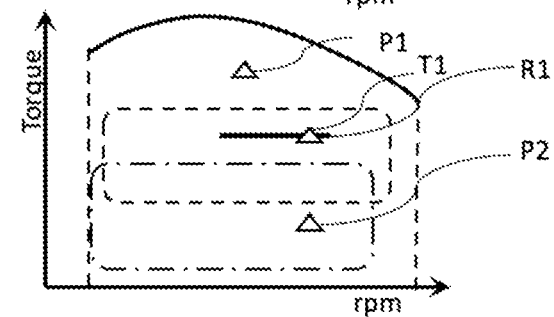

In FIG. 6c, an operating point P1 is shown. It is in the area under the peak torque curve in an area of the map in which SI operation is the only choice. If a demand for less torque is desired, e.g., at point P2, SI combustion mode could be used, but the high efficiency of HCCI operation is also an acceptable operating point. To exploit the high efficiency of HCCI, a transition to HCCI is executed. To operate in HCCI, the throttle is fully open, whereas at operating point P1 with SI, the throttle is partially closed. It helps to heat the intake for HCCI to obtain more certain ignition. Heating the intake is a slow process taking on the order of seconds as opposed to something like changing the pressure in the intake which can be changed within a couple of engine revolutions. Instead of transitioning directly from point P1 to P2, an intermediate operating point, T1 is accessed between P1 and P2. Thus, a transition would be from P1 to T1 to P2. A bar, R1 is shown in FIG. 6c. As described above, during the transition interval between operating at P1 and P2, the ICE adopts a predetermined operating point. Note that in going from P1 to P2, engine speed increases, while torque decreases. An example scenario of such a situation is when a vehicle starts from a stop light, a high torque is required to accelerate the vehicle. After the vehicle has attained nearly the speed required, the vehicle operator backs off on the accelerator pedal to slow down the acceleration and to continue at a slightly increased speed, but less torque is needed because the vehicle has largely come up to speed. R1 is a range of speeds from which the predetermined operating point can be selected. Of course, T1 is selected to have the same engine speed as P2 along the R1 range so that the driver's demand is met.

Figure 6D:
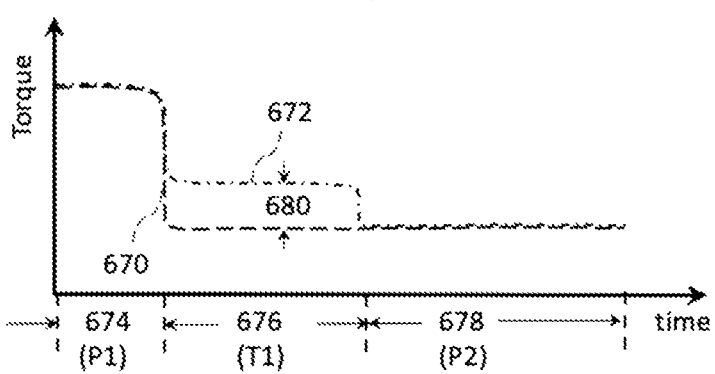

The transition is shown in FIG. 6d on a torque vs. time graph. There are three intervals: the time the ICE is operating in the first combustion mode, i.e., at P1, which is shown as interval 674 in FIG. 6d. When the desire for a change in torque comes in, the ICE enters into the transition interval 676. When ICE parameters are suitable to complete the transition, the ICE is commanded to operate in the new combustion mode (P2) in interval 678. A dash-dot curve 672 indicates the ICE's torque output as a function of time. Torque reduces from interval 674 to 676 and then down again at 678. Desired engine torque is shown as dashed line 670. During interval 676, ICE torque exceeds the desired torque. This is a situation in which the EM is operated as an electrical generator loading the ICE so that the resulting torque provided to driving wheels is the desired torque for a parallel HEV. For some parallel HEV configurations as shown in FIG. 1, a second EM is connected to driving wheels of the vehicle (24 in FIG. 1a, 124 in FIG. 1b, 224 in FIG. 1c, and 324 in FIG. 1d), and second EM torque supplements ICE torque to propel the vehicle. The excess torque is illustrated as 680, i.e., the difference in curves 670 and 672 during interval 676, the battery absorbs the excess electric power from the EM and absorbs or supplies electric power from or to the second EM depending on its operating mode. For a series hybrid HEV as shown in FIG. 2, since EM 422 supply excess electric power due to excess torque of the ICE, the battery absorbs the excess electric power from EM 422 and supplies electric power to EM 424 propelling the vehicle solely during combustion mode-switching transition.

Figure 7A:
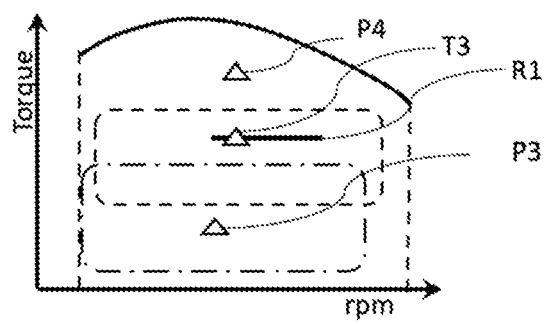

The engine map of FIG. 7a is identical to that shown in FIGS. 6a and 6b. The transition, however, in FIG. 7a is different than that illustrated in FIG. 6c. That is, the ICE is starting at point P3, operating in HCCI combustion mode. The vehicle operator asks for a sudden burst of torque, e.g., a passing maneuver or a need to climb a hill. The new desired operating point is shown as operating point P4, which is in the SI combustion mode zone. If operating in HCCI, the intake manifold is likely being heated and the ICE cannot immediately transition to point P4 because of engine knock and a reduced volumetric efficiency due to the heating of the intake gases. To allow time for the ICE's parameters to be suitable to access point P4, the ICE is commanded to take a point in the SACI combustion mode, labeled T3 in FIG. 7a. Again, this happens to be along one of the predetermined torque operating points indicated by R1, which occurs along a range of engine speeds.

Figure 7B:
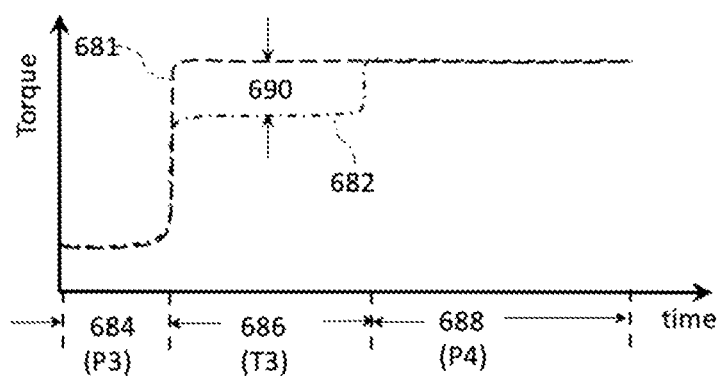

A plot of engine torque as a function of time is shown in FIG. 7b. Desired torque is a dashed curve 681 and ICE provided torque is shown as dash-dot curve 682. ICE torque 682 matches desired torque 681 during P3 during the first interval 684 in which the ICE is operating in the current combustion mode, which HCCI in the present example. In the third interval, 688, when the ICE is operating at the new combustion mode, ICE torque 682 and desired torque 681 are again nearly equal. During the second interval 686, when the ICE is operating at T3, the transition point, the ICE torque 682 is lower than desired torque 681. During interval 686, the EM acts as a motor driving the ICE and provides torque in the amount of the shortfall, which is indicated as 690 so that the resulting torque provided to driving wheels of the vehicle is the desired torque for a parallel HEV. For some parallel HEV configurations as shown in FIG. 1, a second EM connects to driving wheels of the vehicle (24 in FIG. 1a, 124 in FIG. 1b, 224 in FIG. 1c, and 324 in FIG. 1d), and a second EM torque supplements ICE torque to propel the vehicle. The torque in the amount of the shortfall is illustrated as 690, i.e., the difference in curves 681 and 682 during interval 686, the battery supplies electric power to the EM. The battery supplies or absorbs electric power to or from the second EM depending on its operating mode. For a series hybrid HEV as shown in FIG. 2, since EM 422 acts as a motor due to insufficient torque of the ICE, the battery supplies electric power to EM 422 driving the ICE and supplies electric power to EM 424 propelling the vehicle solely during combustion mode-switching transition.

Figure 8A:
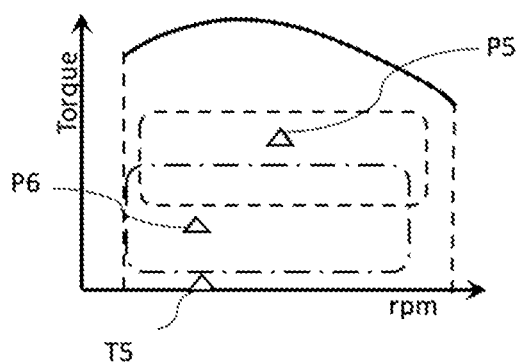
Figure 8B:
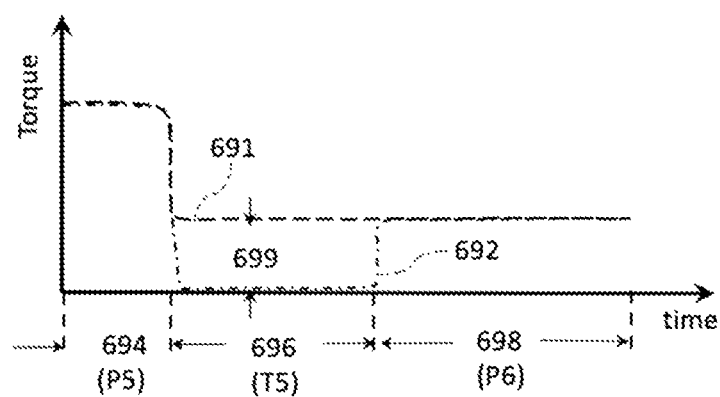

Referring now to FIG. 8a, the ICE's engine map is shown. Again, the description of the map is the same as for FIGS. 6a and 6b, but with a different transition shown on the ICE operating map. The starting point is P5 in a current combustion mode and the goal is to move to point P6 in another combustion mode. In this example, the ICE is turned off during the transition, T5. In FIG. 8b, the timeline of this transition shows that the ICE is operating at point P5 during 694, the first interval. The torque produced by the engine is shown as dash-dot curve 692 and the desired torque is shown as dashed curve 691. During the transition interval, 696, the ICE is not producing any torque. To provide the desired torque, the EM acts as a motor and drives the ICE to the predetermined combustion mode-switching RPM and at same time provides torque 699 to propel the vehicle for a parallel hybrid HEV during combustion mode-switching transition. For some parallel HEV configurations as shown in FIG. 1, a second EM connecting to driving wheels of the vehicle is provided (24 in FIG. 1a, 124 in FIG. 1b, 224 in FIG. 1c, and 324 in FIG. 1d), second EM torque supplements ICE torque to propel the vehicle. The torque in the amount is illustrated as 699, i.e., the difference in curves 691 and 692 during interval 696, the battery supplies electric power to the EM. The battery supplies or absorbs electric power to or from the second EM depending on its operating mode. For a series hybrid HEV as shown in FIG. 2, since EM 422 does not supply electric power to EM 424 during combustion mode-switching transition, battery 420 supplies electric power to EM 422 driving the ICE to the selected predetermined combustion mode-switching RPM and supplies electric power to EM 424 propelling the vehicle solely. When the ICE is prepared to enter the new combustion mode, shown as P6, the transition is completed and ICE torque 692 equals desired torque 691.

In FIGS. 6d, 7b, and 8b, the duration of the transitions appears to be identical in time. However, that is only for illustrative convenience. Some transitions are very short, a few revolutions. Other transitions take longer.

While the best configuration has been described in detail with respect to embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, efficiency, strength, durability, life cycle cost, marketability, speed, endurance, range, appearance, packaging, size, serviceability, weight, manufacturability, ease of assembly, etc. The embodiments described herein that are characterized as less desirable than other embodiments or prior-art implementations with respect to one or more characteristics are not outside the scope of the disclosure and may be desirable for particular applications.

The invention claimed is:

1. A method to control a hybrid electric vehicle (HEV) having an electric machine (EM) mechanically linked to an internal-combustion engine (ICE) and a battery electrically coupled to the EM, the method comprising:
    determining that a transition from a current combustion mode to a new combustion mode should be commanded with a transition interval occurring between the current combustion mode and the new combustion mode;
    selecting one of a plurality of predetermined combustion mode-switching operating points for operating the ICE during the transition interval; and
    commanding the ICE to attain the selected predetermined combustion mode-switching operating point during the transition interval, wherein:
        the selected combustion mode-switching operating point of the ICE is selected based on state of charge of the battery;
        when the selected predetermined combustion mode-switching operating point of the ICE produces insufficient torque to prevent ICE speed from decreasing, the EM acts as a motor and drives the ICE to thereby maintain the selected predetermined combustion mode-switching operating point of the ICE; and
        when the selected predetermined combustion mode-switching operating point of the ICE produces torque that would cause ICE speed to increase, the EM acts as a generator and loads the ICE to thereby maintain the selected predetermined combustion mode-switching operating point of the ICE.

2. The method of claim 1, wherein:
the ICE undergoes preparation to operate in the new combustion mode during the transition interval; and
the preparation involves at least one adjustment of: the intake air temperature of the ICE, the pressure in the intake air system of the ICE, the exhaust gas fraction in intake air being inducted into the ICE, the compression ratio of the ICE, the air-fuel ratio into the ICE, the fuel supply strategy including fuel injection timing and quantity for the ICE, the ignition timing of the ICE, and altering the valve timing and lifting of valves of the ICE, the method further comprising:
commanding the ICE to operate in the new combustion mode when the preparation has been completed.

3. The method of claim 1, wherein determination that the transition from the current combustion mode to the new combustion mode is based on at least one of:
the ICE operating points to support stable combustion in the new combustion mode;
the demand for torque from the HEV by an operator of the vehicle and an expected duration of the transition interval; and
the efficiency of the HEV operating in the new combustion mode being greater than efficiency of the HEV operating in the current combustion mode.

4. The method of claim 1, wherein:
the HEV is a series configuration;
the EM is a first EM mechanically linked to the ICE and electrically coupled to the battery;
the HEV further comprises:
a second EM electrically coupled to the battery; and
driving wheels mechanically connected to the second EM.

5. The method of claim 1, wherein:
the HEV is a parallel configuration;
the EM is a first EM electrically coupled to the battery; and
the EM mechanically linked to the ICE and both mechanically connected to driving wheels of the HEV during the transition.

6. A hybrid electric vehicle (HEV), comprising:
an electric machine (EM) electronically coupled to an EM controller;
an internal-combustion engine (ICE) mechanically linked to the EM and electronically coupled to an ICE controller;
a battery electrically coupled to the EM electronically coupled to a battery controller; and
a vehicle system controller (VSC) that comprises the EM controller, the ICE controller, and the battery controller and a coordination controller (CC) wherein the CC coordinates the EM controller, the ICE controller, and the battery controller.

7. The HEV of claim 6 wherein:
the CC determines that a transition from a current combustion mode to a new combustion mode should be commanded with a transition interval occurring between the current combustion mode and the new combustion mode;
the CC selects one of a plurality of predetermined combustion mode-switching operating points for operating the ICE during the transition interval;
the CC commands the ICE to attain the selected predetermined combustion mode-switching operating point during the transition interval;
when the selected predetermined combustion mode-switching operating point of the ICE produces insufficient torque to prevent ICE speed from decreasing during the transition, the EM acts as a motor and drives the ICE to thereby maintain the selected predetermined combustion mode-switching operating point of the ICE; and
when the selected predetermined combustion mode-switching operating point of the ICE produces torque that would cause ICE speed to increase during the transition, the EM acts as a generator and loads the ICE to thereby maintain the selected predetermined combustion mode-switching operating point of the ICE.

8. The HEV of claim 6, wherein the selected predetermined combustion mode-switching operating point is based on at least one of: operator demanded torque at the driving wheels, ICE operating points in the new combustion mode being able to support stable combustion, the efficiency of the HEV operating in the new combustion mode being greater than efficiency of the HEV operating in the current combustion mode.

9. The HEV of claim 6, wherein:
the ICE undergoes preparation to operate in the new combustion mode during the transition interval;
the preparation involves at least one adjustment of: the intake air temperature of the ICE, the pressure in the intake air system of the ICE, the exhaust gas fraction in intake air being inducted into the ICE, the compression ratio of the ICE, the air-fuel ratio into the ICE, the fuel supply strategy including fuel injection timing and quantity for the ICE, the ignition timing of the ICE, and altering the valve timing and lifting of valves of the ICE; and
the CC commands the ICE to operate in the new combustion mode when the preparation has been completed.

10. The HEV of claim 6, wherein determination whether to command a transition from a current combustion mode to a new combustion mode is based on at least one of:
efficiency of the HEV operating in the new combustion mode being greater than efficiency of the HEV operating in the current combustion mode, operator demanded torque, the new combustion mode being able to support stable combustion, and state of charge of the battery.

11. The HEV of claim 6, wherein:
the HEV is a series configuration; and
the EM is a first EM mechanically linked to the ICE and electrically coupled to the battery, the HEV further comprises:
a second EM electrically coupled to the battery; and
driving wheels are mechanically connected to the second EM.

12. The HEV of claim 6, wherein:
the HEV is a parallel configuration;
the EM is a first EM electrically coupled to the battery; and
the EM is mechanically linked to the ICE and both the EM and the ICE are mechanically connected to driving wheels of the HEV during the transition.

13. A method to control a series hybrid electric vehicle (HEV) having a first electric machine (EM1) mechanically linked to an internal-combustion engine (ICE), a second electric machine (EM2) mechanically connected to driving wheels of the HEV, a battery electrically coupled to EM1 and EM2, an EM2 controller electronically coupled to EM2, and a coordination controller (CC) electronically coupled to the EM2 controller, the method comprising:

determining that a transition from a current combustion mode to a new combustion mode should be commanded with a transition interval occurring between the current combustion mode and the new combustion mode;

selecting one of a plurality of predetermined combustion mode-switching operating points for operating the ICE during the transition interval;

commanding the ICE to attain the selected predetermined combustion mode-switching operating point during the transition interval; and commanding the ICE to operate the new combustion mode when the preparation being completed after the transition interval, wherein:
the selected combustion mode-switching operating point of the ICE is selected based on state of charge of the battery.

14. The method of claim 13, wherein:
during the transition interval, the ICE is prepared to operate in the new combustion mode, such preparation includes at least one adjustment of: the intake air temperature of the ICE, the pressure in the intake air system of the ICE, the exhaust gas fraction in intake air being inducted into the ICE, the compression ratio of the ICE, the air-fuel ratio into the ICE, the fuel supply strategy including fuel injection timing and quantity for the ICE, the ignition timing of the ICE, and altering the valve timing and lifting of valves of the ICE.

15. The method of claim 13, wherein:
when the selected predetermined combustion mode-switching operating point of the ICE produces insufficient torque to prevent ICE speed from decreasing, EM1 acts as a motor and drives the ICE to thereby maintain the selected predetermined combustion mode-switching operating point of the ICE; and the battery supplies electric power to the EM1 for driving the ICE and electric power to the EM2 for driving wheels of the HEV during combustion mode transition;

when the selected predetermined combustion mode-switching operating point of the ICE produces torque that would cause ICE speed to increase, EM1 acts as a generator and loads the ICE to thereby maintain the selected predetermined combustion mode-switching operating point of the ICE; and the output electric power of the EM1 for loading the ICE is absorbed by the battery and supplied to the EM2 for driving wheels of the HEV during combustion mode transition.

16. The method of claim 13, wherein determination whether to command a transition from a current combustion mode to a new combustion mode is based on at least one of: efficiency of the HEV operating in the new combustion mode being greater than efficiency of the HEV operating in the current combustion mode, operator demanded torque, and the ICE operating points to support stable combustion in the new combustion mode.

17. A method to control a parallel hybrid electric vehicle (HEV) having an electric machine (EM) mechanically linked to an internal-combustion engine (ICE), both the EM and the ICE are mechanically connected to driving wheels of the HEV, and a battery electrically coupled to the EM, the method comprising:
determining that a transition from a current combustion mode to a new combustion mode should be commanded with a transition interval occurring between the current combustion mode and the new combustion mode;

selecting one of a plurality of predetermined combustion mode-switching operating points for operating the ICE during the transition interval;

commanding the ICE to attain the selected predetermined combustion mode-switching operating point during the transition interval; and commanding the ICE to operate in the new combustion mode after the transition interval, wherein:
the selected combustion mode-switching operating point of the ICE is selected based on state of charge of the battery.

18. The method of claim 17, wherein:
during the transition interval, the ICE is prepared to operate in the new combustion mode, such preparation includes at least one adjustment of: the intake air temperature of the ICE, the pressure in the intake air system of the ICE, the exhaust gas fraction in intake air being inducted into the ICE, the compression ratio of the ICE, the air-fuel ratio into the ICE, the fuel supply strategy including fuel injection timing and quantity for the ICE, the ignition timing of the ICE, valve timing of the ICE, and lift profile of valves of the ICE.

19. The method of claim 17, wherein:
when the selected predetermined combustion mode-switching operating point of the ICE produces insufficient torque to prevent ICE speed from decreasing, the EM acts as a motor thereby driving the ICE to maintain the selected predetermined combustion mode-switching operating point of the ICE and the battery supplies electric power to the EM for driving both the ICE and driving wheels of the HEV during combustion mode transition; and when the selected predetermined combustion mode-switching operating point of the ICE produces torque that would cause ICE speed to increase, the EM acts as a generator thereby loading the ICE to maintain the selected predetermined combustion mode-switching operating point of the ICE and the output electric power of the EM for loading the ICE is absorbed by the battery and the ICE provides torque for driving wheels of the HEV during the selected predetermined combustion mode-switching transition.

20. The method of claim 17, wherein determination whether to command a transition from a current combustion mode to a new combustion mode is based on at least one of: efficiency of the HEV operating in the new combustion mode being greater than efficiency of the HEV operating in the current combustion mode, operator demanded torque, and the ICE operating points in the new combustion mode support stable combustion.

* * * * *